US009146851B2

(12) United States Patent
Pittelko

(10) Patent No.: US 9,146,851 B2
(45) Date of Patent: Sep. 29, 2015

(54) SINGLE-LEVEL CELL AND MULTI-LEVEL CELL HYBRID SOLID STATE DRIVE

(75) Inventor: Michael H. Pittelko, Chaska, MN (US)

(73) Assignee: Compellent Technologies, Eden Prairie, MN (US)

( * ) Notice: Subject to any disclaimer, the term of this patent is extended or adjusted under 35 U.S.C. 154(b) by 29 days.

(21) Appl. No.: 13/429,511

(22) Filed: Mar. 26, 2012

(65) Prior Publication Data

US 2013/0254458 A1 Sep. 26, 2013

(51) Int. Cl.
*G06F 12/02* (2006.01)

(52) U.S. Cl.
CPC ............ *G06F 12/02* (2013.01); *G06F 12/0246* (2013.01); *G06F 2212/7202* (2013.01); *G06F 2212/7205* (2013.01)

(58) Field of Classification Search
USPC ............ 711/103, 114, 154; 365/200; 714/704
See application file for complete search history.

(56) References Cited

U.S. PATENT DOCUMENTS

| | | |
|---|---|---|
| 5,155,835 A | 10/1992 | Belsan |
| 5,274,807 A | 12/1993 | Hoshen et al. |
| 5,276,867 A | 1/1994 | Kenley et al. |
| 5,327,535 A | 7/1994 | Ogata et al. |
| 5,331,646 A | 7/1994 | Krueger et al. |
| 5,371,882 A | 12/1994 | Ludlam |
| 5,390,327 A | 2/1995 | Lubbers |
| 5,548,740 A | 8/1996 | Kiyohara |
| 5,572,661 A | 11/1996 | Jacobson |
| 5,644,701 A | 7/1997 | Takewaki |
| 5,659,704 A | 8/1997 | Burkes et al. |
| 5,696,934 A | 12/1997 | Jacobson et al. |
| 5,742,792 A | 4/1998 | Yanai et al. |
| 5,835,953 A | 11/1998 | Ohran |
| 5,897,661 A | 4/1999 | Baranovsky et al. |
| RE36,462 E | 12/1999 | Chang et al. |

(Continued)

FOREIGN PATENT DOCUMENTS

| | | |
|---|---|---|
| EP | 0757317 A2 | 2/1997 |
| EP | 0780758 | 6/1997 |

(Continued)

OTHER PUBLICATIONS

Li-Pin Chang, Hybrid solid-state disks: Combining heterogeneous NAND flash in large SSDs, Design Automation Conference, 2008. ASPDAC 2008. Asia and South Pacific, pp. 428-433.*

(Continued)

*Primary Examiner* — Cheng-Yuan Tseng
*Assistant Examiner* — Kamal K Dewan
(74) *Attorney, Agent, or Firm* — Winthrop & Weinstine, P.A.

(57) ABSTRACT

A solid state drive (SSD) having a first memory portion comprising SLC flash memory and a second memory portion comprising MLC flash memory. The first memory portion may store read/write data, and the second memory portion may store read-only or read-mostly data. In some instances, the second memory portion may store historical data. The present disclosure also relates to a method of data progression in a hybrid solid state drive having both single-level cell (SLC) flash memory and multi-level cell (MLC) flash memory. The method may include monitoring write operations to the SLC memory, determining whether the frequency of write operations to a particular portion of the SLC memory is below a determined threshold, and moving the data stored in the particular portion of the SLC memory to the MLC memory.

16 Claims, 3 Drawing Sheets

(56) References Cited

U.S. PATENT DOCUMENTS

| | | |
|---|---|---|
| 6,052,759 A | 4/2000 | Stallmo et al. |
| 6,052,797 A | 4/2000 | Ofek et al. |
| 6,058,489 A | 5/2000 | Schultz et al. |
| 6,070,249 A | 5/2000 | Lee |
| 6,073,218 A | 6/2000 | Dekoning et al. |
| 6,073,221 A | 6/2000 | Beal et al. |
| 6,073,222 A | 6/2000 | Ohran |
| 6,078,932 A | 6/2000 | Haye et al. |
| RE36,846 E | 8/2000 | Ng et al. |
| 6,115,781 A | 9/2000 | Howard |
| 6,192,444 B1 | 2/2001 | White et al. |
| 6,212,531 B1 | 4/2001 | Blea et al. |
| 6,269,431 B1 | 7/2001 | Dunham |
| 6,269,453 B1 | 7/2001 | Krantz |
| 6,275,897 B1 | 8/2001 | Bachmat |
| 6,275,898 B1 | 8/2001 | DeKoning |
| 6,282,671 B1 | 8/2001 | Islam et al. |
| 6,311,251 B1 | 10/2001 | Merritt et al. |
| 6,353,878 B1 | 3/2002 | Dunham |
| 6,366,987 B1 | 4/2002 | Tzelnic et al. |
| 6,366,988 B1 | 4/2002 | Skiba et al. |
| 6,415,296 B1 | 7/2002 | Challener et al. |
| 6,434,681 B1 | 8/2002 | Armangau |
| 6,438,638 B1 | 8/2002 | Jones et al. |
| 6,516,425 B1 | 2/2003 | Belhadj et al. |
| 6,560,615 B1 | 5/2003 | Zayas et al. |
| 6,591,335 B1 | 7/2003 | Sade et al. |
| 6,604,171 B1 | 8/2003 | Sade |
| 6,611,897 B2 | 8/2003 | Komachiya et al. |
| 6,618,794 B1 | 9/2003 | Sicola et al. |
| 6,636,778 B2 | 10/2003 | Basham et al. |
| 6,718,436 B2 | 4/2004 | Kim et al. |
| 6,732,125 B1 | 5/2004 | Autrey |
| 6,799,258 B1 | 9/2004 | Linde |
| 6,804,755 B2 | 10/2004 | Selkirk et al. |
| 6,826,711 B2 | 11/2004 | Moulton et al. |
| 6,839,827 B1 | 1/2005 | Beardsley et al. |
| 6,839,864 B2 | 1/2005 | Mambakkam et al. |
| 6,857,057 B2 | 2/2005 | Nelson et al. |
| 6,862,609 B2 | 3/2005 | Merkey |
| 6,877,109 B2 | 4/2005 | Delaney et al. |
| 6,883,065 B1 | 4/2005 | Pittelkow et al. |
| 6,904,599 B1 | 6/2005 | Cabrera et al. |
| 6,907,505 B2 | 6/2005 | Cochran et al. |
| 6,915,241 B2 | 7/2005 | Kohlmorgen et al. |
| 6,915,454 B1 | 7/2005 | Moore et al. |
| 6,938,123 B2 | 8/2005 | Willis et al. |
| 6,948,038 B2 | 9/2005 | Berkowitz et al. |
| 6,952,794 B2 | 10/2005 | Lu |
| 6,957,294 B1 | 10/2005 | Saunders et al. |
| 6,957,362 B2 | 10/2005 | Armangau |
| 6,981,114 B1 | 12/2005 | Wu et al. |
| 6,996,582 B2 | 2/2006 | Daniels et al. |
| 6,996,741 B1 | 2/2006 | Pittelkow et al. |
| 7,000,069 B2 | 2/2006 | Bruning et al. |
| 7,003,688 B1 | 2/2006 | Pittelkow et al. |
| 7,017,076 B2 | 3/2006 | Ohno et al. |
| 7,032,093 B1 | 4/2006 | Cameron |
| 7,039,778 B2 | 5/2006 | Yamasaki |
| 7,043,663 B1 | 5/2006 | Pittelkow et al. |
| 7,047,358 B2 | 5/2006 | Lee et al. |
| 7,051,182 B2 | 5/2006 | Blumenau et al. |
| 7,058,788 B2 | 6/2006 | Niles et al. |
| 7,069,468 B1 | 6/2006 | Olson et al. |
| 7,072,916 B1 | 7/2006 | Lewis et al. |
| 7,085,899 B2 | 8/2006 | Kim et al. |
| 7,085,956 B2 | 8/2006 | Petersen et al. |
| 7,089,395 B2 | 8/2006 | Jacobson et al. |
| 7,093,161 B1 | 8/2006 | Mambakkam et al. |
| 7,100,080 B2 | 8/2006 | Howe |
| 7,107,417 B2 | 9/2006 | Gibble et al. |
| 7,111,147 B1 | 9/2006 | Strange et al. |
| 7,124,272 B1 | 10/2006 | Kennedy et al. |
| 7,127,633 B1 | 10/2006 | Olson et al. |
| 7,133,884 B1 | 11/2006 | Murley et al. |
| 7,134,053 B1 | 11/2006 | Moore |
| 7,162,587 B2 | 1/2007 | Hiken et al. |
| 7,162,599 B2 | 1/2007 | Berkowitz et al. |
| 7,181,581 B2 | 2/2007 | Burkey |
| 7,184,933 B2 | 2/2007 | Prekeges et al. |
| 7,191,304 B1 | 3/2007 | Cameron et al. |
| 7,194,653 B1 | 3/2007 | Hadders et al. |
| 7,197,614 B2 | 3/2007 | Nowakowski |
| 7,216,258 B2 | 5/2007 | Ebsen et al. |
| 7,222,205 B2 | 5/2007 | Jones et al. |
| 7,228,441 B2 | 6/2007 | Fung |
| 7,251,713 B1 | 7/2007 | Zhang |
| 7,272,666 B2 | 9/2007 | Rowan et al. |
| 7,272,735 B2 | 9/2007 | Fung |
| 7,293,196 B2 | 11/2007 | Hiken et al. |
| 7,305,579 B2 | 12/2007 | Williams |
| 7,320,052 B2 | 1/2008 | Zimmer et al. |
| 7,380,113 B2 | 5/2008 | Ebsen et al. |
| 7,398,418 B2 | 7/2008 | Soran et al. |
| 7,404,102 B2 | 7/2008 | Soran et al. |
| 7,406,631 B2 | 7/2008 | Moore |
| 7,475,098 B2 | 1/2009 | Patterson et al. |
| 7,484,111 B2 | 1/2009 | Fung |
| 7,493,514 B2 | 2/2009 | Soran et al. |
| 7,512,822 B2 | 3/2009 | Fung |
| 7,533,283 B2 | 5/2009 | Fung |
| 7,552,350 B2 | 6/2009 | Fung |
| 7,558,976 B2 | 7/2009 | Fung |
| 7,562,239 B2 | 7/2009 | Fung |
| 7,574,622 B2 | 8/2009 | Soran et al. |
| 7,603,532 B2 | 10/2009 | Rajan et al. |
| 7,613,945 B2 | 11/2009 | Soran et al. |
| 7,672,226 B2 | 3/2010 | Shea |
| 7,702,948 B1 | 4/2010 | Kalman et al. |
| 8,078,794 B2 * | 12/2011 | Lee et al. ............ 711/103 |
| 2001/0020282 A1 | 9/2001 | Murotani et al. |
| 2002/0004912 A1 | 1/2002 | Fung |
| 2002/0004913 A1 | 1/2002 | Fung |
| 2002/0004915 A1 | 1/2002 | Fung |
| 2002/0007438 A1 | 1/2002 | Lee |
| 2002/0007463 A1 | 1/2002 | Fung |
| 2002/0007464 A1 | 1/2002 | Fung |
| 2002/0053009 A1 | 5/2002 | Selkirk et al. |
| 2002/0056031 A1 | 5/2002 | Skiba et al. |
| 2002/0062454 A1 | 5/2002 | Fung |
| 2002/0073278 A1 | 6/2002 | McDowell |
| 2002/0103969 A1 | 8/2002 | Koizumi et al. |
| 2002/0112113 A1 | 8/2002 | Karpoff et al. |
| 2002/0129214 A1 | 9/2002 | Sarkar |
| 2002/0188768 A1 | 12/2002 | Hirakawa et al. |
| 2003/0005248 A1 | 1/2003 | Selkirk et al. |
| 2003/0009619 A1 | 1/2003 | Kano et al. |
| 2003/0046270 A1 | 3/2003 | Leung et al. |
| 2003/0065901 A1 | 4/2003 | Krishnamurthy |
| 2003/0110263 A1 | 6/2003 | Shillo |
| 2003/0182301 A1 | 9/2003 | Patterson et al. |
| 2003/0182503 A1 | 9/2003 | Leong et al. |
| 2003/0188208 A1 | 10/2003 | Fung |
| 2003/0200473 A1 | 10/2003 | Fung |
| 2003/0212865 A1 | 11/2003 | Hicken et al. |
| 2003/0221060 A1 | 11/2003 | Umberger et al. |
| 2004/0030822 A1 | 2/2004 | Rajan et al. |
| 2004/0030951 A1 | 2/2004 | Armangau |
| 2004/0088505 A1 | 5/2004 | Watanabe |
| 2004/0107222 A1 | 6/2004 | Venkatesh et al. |
| 2004/0107315 A1 | 6/2004 | Watanabe et al. |
| 2004/0111558 A1 | 6/2004 | Kistler et al. |
| 2004/0117572 A1 | 6/2004 | Welsh et al. |
| 2004/0133742 A1 | 7/2004 | Vasudevan et al. |
| 2004/0163009 A1 | 8/2004 | Goldstein et al. |
| 2004/0172577 A1 | 9/2004 | Tan et al. |
| 2005/0010618 A1 | 1/2005 | Hayden |
| 2005/0010731 A1 | 1/2005 | Zalewski et al. |
| 2005/0027938 A1 | 2/2005 | Burkey |
| 2005/0055603 A1 | 3/2005 | Soran et al. |
| 2005/0065962 A1 | 3/2005 | Rowan et al. |
| 2005/0066095 A1 | 3/2005 | Mullick et al. |
| 2005/0108582 A1 | 5/2005 | Fung |
| 2005/0182992 A1 | 8/2005 | Land et al. |

(56) References Cited

U.S. PATENT DOCUMENTS

| | | |
|---|---|---|
| 2005/0262325 A1 | 11/2005 | Shmueli et al. |
| 2006/0031287 A1 | 2/2006 | Ulrich |
| 2006/0093282 A1 | 5/2006 | Shepherd et al. |
| 2006/0107006 A1 | 5/2006 | Green et al. |
| 2006/0161752 A1 | 7/2006 | Burkey |
| 2006/0161808 A1 | 7/2006 | Burkey |
| 2006/0179218 A1 | 8/2006 | Burkey |
| 2006/0206536 A1 | 9/2006 | Sawdon et al. |
| 2006/0218360 A1 | 9/2006 | Burkey |
| 2006/0230244 A1 | 10/2006 | Amarendran et al. |
| 2006/0248324 A1 | 11/2006 | Fung |
| 2006/0248325 A1 | 11/2006 | Fung |
| 2006/0248358 A1 | 11/2006 | Fung |
| 2006/0248359 A1 | 11/2006 | Fung |
| 2006/0248360 A1 | 11/2006 | Fung |
| 2006/0248361 A1 | 11/2006 | Fung |
| 2006/0253669 A1 | 11/2006 | Lobdell |
| 2006/0253717 A1 | 11/2006 | Fung |
| 2006/0259797 A1 | 11/2006 | Fung |
| 2006/0265608 A1 | 11/2006 | Fung |
| 2006/0265609 A1 | 11/2006 | Fung |
| 2006/0271604 A1 | 11/2006 | Shoens |
| 2007/0016749 A1 | 1/2007 | Nakamura et al. |
| 2007/0016754 A1 | 1/2007 | Testardi |
| 2007/0101173 A1 | 5/2007 | Fung |
| 2007/0180306 A1 | 8/2007 | Soran et al. |
| 2007/0234110 A1 | 10/2007 | Soran et al. |
| 2007/0240006 A1 | 10/2007 | Fung |
| 2007/0245165 A1 | 10/2007 | Fung |
| 2007/0260830 A1 | 11/2007 | Faibish et al. |
| 2007/0266066 A1 | 11/2007 | Kapoor et al. |
| 2007/0288401 A1 | 12/2007 | Hood et al. |
| 2008/0005468 A1 | 1/2008 | Faibish et al. |
| 2008/0091877 A1 | 4/2008 | Klemm et al. |
| 2008/0112238 A1* | 5/2008 | Kim et al. ............ 365/200 |
| 2008/0140918 A1 | 6/2008 | Sutardja |
| 2008/0288546 A1 | 11/2008 | Adkins et al. |
| 2009/0043831 A1* | 2/2009 | Antonopoulos et al. ...... 707/205 |
| 2009/0132617 A1 | 5/2009 | Soran et al. |
| 2009/0138755 A1 | 5/2009 | Soran et al. |
| 2009/0235104 A1 | 9/2009 | Fung |
| 2009/0300412 A1 | 12/2009 | Soran et al. |
| 2010/0037023 A1 | 2/2010 | Aszmann et al. |
| 2010/0153632 A1* | 6/2010 | Lee et al. ............ 711/103 |
| 2011/0010488 A1 | 1/2011 | Aszmann et al. |
| 2011/0197017 A1* | 8/2011 | Yu et al. ............ 711/103 |
| 2012/0059992 A1* | 3/2012 | Radke et al. ......... 711/114 |

FOREIGN PATENT DOCUMENTS

| | | |
|---|---|---|
| EP | 1462927 A2 | 9/2004 |
| EP | 0706113 A2 | 8/2005 |
| GB | 2373075 | 9/2002 |
| JP | 1790351987 | 8/1987 |
| JP | 3259320 | 11/1991 |
| JP | 732211993 | 3/1993 |
| JP | 1872011994 | 7/1994 |
| JP | 7200367 | 8/1995 |
| JP | 844503 | 2/1996 |
| JP | 8278850 | 10/1996 |
| JP | 690281997 | 3/1997 |
| JP | 9128305 | 5/1997 |
| JP | 2546281998 | 9/1998 |
| JP | 3278031999 | 11/1999 |
| JP | 2000132343 | 5/2000 |
| JP | 2001147785 | 5/2001 |
| JP | 2001337850 | 12/2001 |
| JP | 2001344139 | 12/2001 |
| JP | 200232197 | 1/2002 |
| JP | 200273393 | 3/2002 |
| JP | 2002278819 | 9/2002 |
| JP | 2002366398 | 12/2002 |
| JP | 200315915 | 1/2003 |
| JP | 200350724 | 2/2003 |
| JP | 2005512191 | 4/2005 |
| WO | 0013077 | 3/2000 |
| WO | 0225445 | 3/2002 |
| WO | 03048941 | 6/2003 |
| WO | 2005017737 | 2/2005 |

OTHER PUBLICATIONS

Feng Chen et al, Hystor: Making the Best Use of Solid State Drives in High Performance Storage Systems, ACM New York, NY Proceeding, ICS '11 Proceedings of the international conference on Supercomputing pp. 22-32.*

"The Compaq Enterprise Network Storage Architecture: An Overview", source(s): Compaq, May 2000, pp. 1-22.

Massiglia, P., "Chapter 11: Dynamic Data Mapping", The RAIDbook. A Source for RAID Technology, Feb. 1997; pp. 197-208.

Wilkes, John, et al. "The HP AutoRAID Hierarchical Storage System", ACM Transactions on Computer Systems, Association for Computing Machinery, ACM Transactions on Computer Systems, vol. 14, No. 1, Feb. 1996, pp. 108-136.

The PC Guide, "RAID Level 7", 2001, Retrieved from http://www.pcguide.com/ref/hdd/perf/raid/levels/singleLevel7-c.html on Sep. 13, 2010, 3 pp.

* cited by examiner

SINGLE-LEVEL CELL AND MULTI-LEVEL CELL HYBRID SOLID STATE DRIVE

FIELD OF THE INVENTION

The present disclosure generally relates to solid state drives and data storage systems and methods utilizing solid state drives. More particularly, the present disclosure relates to hybrid solid state drives having both single-level cells and multi-level cells and data storage systems including such solid state drives.

BACKGROUND OF THE INVENTION

The use of solid state drives (SSDs) in data storage systems is increasing. SSDs are advantageous over hard disk drives (HDD), for example, for a variety of reasons, including but not limited to: SSDs have faster random access time; SSDs have lower read latency time; SSDs have more consistent read performance; defragmentation is not necessary for SSDs; SSDs have no moving parts and thus, make no noise; SSDs do not require special cooling system and can tolerate higher temperatures; SSDs are smaller and lighter; SSDs generally are more reliable and have longer lifetimes; and SSDs consume less power. A significant drawback of SSDs, however, is their relatively high cost compared to HDDs.

SSDs can be based on either volatile (RAM-based) or non-volatile (flash) memory. Non-volatile memory can maintain information even when there is no power, whereas volatile memory requires continual power to maintain stored information. SSDs having non-volatile flash memory store information in memory cells that are made from floating-gate transistors. Memory cells can be either NOR gate flash or NAND gate flash. NOR allows for random-access reading and NAND allows only page access.

SSDs having non-volatile flash memory traditionally are either single-level cell (SLC) devices or multi-level cell (MLC) devices. SLC devices store only one bit of information per cell, and thus each cell can have one of two states (i.e., 0 or 1). MLC devices can store more than one bit of information per cell, with most traditional MLC devices storing two bits of information per cell, and thus each cell having four possible states (i.e., 00, 01, 10, or 11). SLC devices can have advantages over MLC devices in faster write speeds, lower power consumption, and higher cell endurance. However, SLC devices generally cost more per megabyte of storage than MLC devices.

In view of the foregoing, there is a need for an improved SSD having the beneficial features of both SLC and MLC technology. More particularly, there is a need for hybrid solid state drives having both single-level cells and multi-level cells and data storage systems including such solid state drives.

BRIEF SUMMARY OF THE INVENTION

The present disclosure, in one embodiment, relates to a SSD comprising a first memory portion comprising SLC flash memory and a second memory portion comprising MLC flash memory. The first memory portion may comprise less than 50% of the overall memory of the solid state drive, and in some embodiments, may comprise between about 20% and 30% of the overall memory of the solid state drive. The first memory portion may store read/write data, and the second memory portion may store read-only or read-mostly data. In some instances, the second memory portion may store historical data.

The present disclosure, in another embodiment, relates to a data storage system including a hybrid solid state drive (SSD) having single-level cell (SLC) flash memory and multi-level cell (MLC) flash memory. The data storage system may further include HDDs or other types of storage devices. The data storage system may further be configured to monitor write operations to the SLC memory of the hybrid SSD, determine whether the frequency of write operations to a particular portion of the SLC memory is below a determined threshold, and move the data stored in the particular portion of the SLC memory to the MLC memory of the hybrid SSD. In addition, the data storage system may further be configured to move data stored in the MLC memory of the hybrid SSD to the another type of storage device, such as a HDD. In some instances, the data storage system may further be configured to store historical data in the MLC memory of the hybrid SSD.

The present disclosure, in yet another embodiment, relates to a method of data progression in a hybrid solid state drive having both single-level cell (SLC) flash memory and multi-level cell (MLC) flash memory. The method may include monitoring write operations to the SLC memory, determining whether the frequency of write operations to a particular portion of the SLC memory is below a determined threshold, and moving the data stored in the particular portion of the SLC memory to the MLC memory.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure relates to novel and advantageous SSDs, data storage systems, and methods utilizing SSDs. More particularly, the present disclosure relates to hybrid SSDs having both single-level cells and multi-level cells and data storage systems including such SSDs. Additionally, the present disclosure relates to novel and advantageous data storage systems including SSDs and utilizing data progression (DP) techniques.

Including SSDs in data storage systems is advantageous over using only HDDs, for example, for a variety of reasons as discussed above. As disclosed in U.S. patent application Ser. No. 12/501,907, entitled "Solid State Drive Data Storage System and Method," and filed Jul. 13, 2009, which is herein incorporated by reference in its entirety, ideally, a data storage system could take advantage of the speed and reliability of SSDs, but in a manner that is efficient, so as to minimize the impact of the increased monetary cost of SSDs relative to HDDs.

As described in U.S. patent application Ser. No. 12/501, 907, and discussed above, a SSD can be based on either volatile (RAM-based) memory or non-volatile (flash) memory. Non-volatile flash memory stores information in memory cells that are made from floating-gate transistors. SSDs having non-volatile flash memory traditionally are either single-level cell (SLC) devices or multi-level cell (MLC) devices. SLC devices store only one bit of information per cell, and thus each cell can have one of two states (i.e., 0 or 1). MLC devices can store more than one bit of information per cell, with most traditional MLC devices storing two bits of information per cell, and thus each cell having four possible states (i.e., 00, 01, 10, or 11). SLC devices can have advantages over MLC devices in faster write speeds, lower power consumption, and higher cell endurance. However, SLC devices generally cost more per megabyte of storage than MLC devices.

The present disclosure recognizes that in many applications the cost of a SLC SSD may be prohibitive, but the lower cell endurance or performance characteristics of a MLC SSD may not be adequate. Accordingly, the present disclosure recognizes the desirability of a single SSD having a balance of the benefits of a SLC device (e.g., faster write speeds and higher cell endurance) and the benefits of a MLC device (e.g., lower cost).

Figure 1:
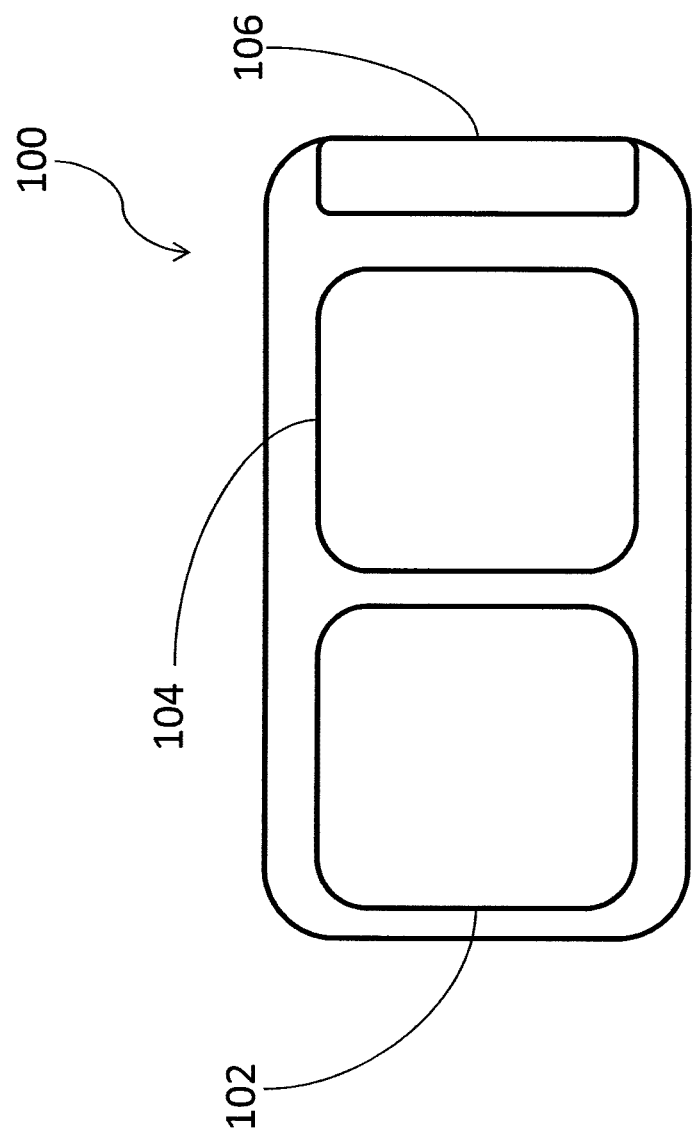
FIG. 1 is schematic drawing of a hybrid SSD according to an embodiment of the present disclosure.

In one embodiment of the present disclosure, illustrated in FIG. 1, a single or hybrid SSD 100 may include non-volatile flash memory having a first portion 102 of SLC memory and a second portion 104 of MLC memory. The ratio of SLC memory 102 to MLC memory 104 may be any suitable ratio from nearly 0% to nearly 100% SLC memory and nearly 100% to nearly 0% MLC memory, respectively, and the ratio of SLC memory to MLC memory may be selected for any suitable reason, including but not limited to, randomly, based on the desired use or application, etc. In an embodiment, the SSD 100 may have less than 50% of the overall memory being SLC memory to reduce overall cost of the SSD. In a particular embodiment, the SSD 100 may include approximately 20% to 30% SLC memory and approximately 70% to 80% MLC memory.

The non-volatile flash memory cells, either SLC or MLC, can be either NOR gate flash or NAND gate flash. For example, a hybrid SSD 100, as described herein, may contain flash memory that is exclusively NOR flash or exclusively NAND flash. Alternatively, a hybrid SSD 100 may contain flash memory of both the NOR and NAND gate type. Similarly, the SLC memory portion 102 and the MLC memory portion 104 may each separately contain flash memory that is exclusively NOR flash, exclusively NAND flash, or both NOR and NAND flash. NOR flash may be used as a storage device by using the random-access programming of which NOR is capable. Some NOR devices may include read-while-write functionality where the code can continue to be executed even if a program or erase operation is happening in the background. However, the write speeds of NOR flash are not as fast as NAND flash. Also, in terms of data storage, NAND flash is capable of higher densities, larger capacities at lower cost, and faster sequential read speeds. It will be understood by those skilled in the art that using different combinations of NOR and/or NAND flash may provide additional storage efficiencies in a data storage system using SSDs according to the present disclosure.

The various embodiments of hybrid SSDs 100 of the present disclosure may be configured for connection with a data storage system or other processing system using any suitable interface 106. For example, any of the standard drive interfaces, such as but not limited to, Serial ATA (SATA), IDE-ATA, Serial Attached SCSI (SAS), Fibre Channel, iSCSI, Peripheral Component Interconnect Express (PCIe), and Dual In-line Memory Module (DIMM), may be provided on the SSD for compatibility with existing systems.

A hybrid SSD according to the present disclosure may be configured to perform particular types of operations optimally. An SSD, for instance, may be configured to be read/write optimized (e.g., have a large amount of spares) or read optimized (e.g., have fewer spares with more usable Logical Block Addressing (LBA) space). In further embodiments, each memory portion 102, 104 could independently be configured to be read/write optimized or read optimized.

In this manner, for example, the SLC memory 102 could be configured for read/write optimization or read optimization, and the MLC memory 104 could be configured for read/write optimization or read optimization, independently of the SLC memory. For example, SLC memory is characterized by having both great read durability and great write durability, and thus, the SLC memory portion 102, in one embodiment, may be configured for read/write optimization. MLC memory, on the other hand, may have great read durability and, as an advantage over SLC memory, is coupled with a lower monetary cost. But, MLC memory has relatively poor write durability. Accordingly, in one embodiment, the MLC memory portion 104 may be configured to be read optimized.

Read/write data can thus be segregated on a read/write optimized SLC memory portion 102 while read-only or read-mostly data can be segregated on a read optimized MLC memory portion 104. It will be understood by those in the art, however, that read-only or read-mostly data may also be stored on SLC memory portions and/or read/write data may also be stored on MLC memory portions, and the above example embodiments are not limiting in this respect. Segregating the read-only or read-mostly data and the read/write data on a single hybrid SSD, according to embodiments of the present disclosure, may provide a significant performance boost and cost efficiency.

In still further embodiments, not only may both the SLC and MLC memory portions of the hybrid SSD be configured as read/write optimized or read optimized, but both SLC and MLC memory portions may be converted on demand from read/write optimized memory to read optimized memory. Conversely, both SLC and MLC memory portions may be converted from read optimized memory to read/write optimized memory. However, while SLC memory that is read/write optimized or read optimized may be very efficient in either optimization, MLC memory that is read optimized may be very read efficient, but when it is read/write optimized, may only be marginally efficient and have lower overall endurance.

Figure 2:
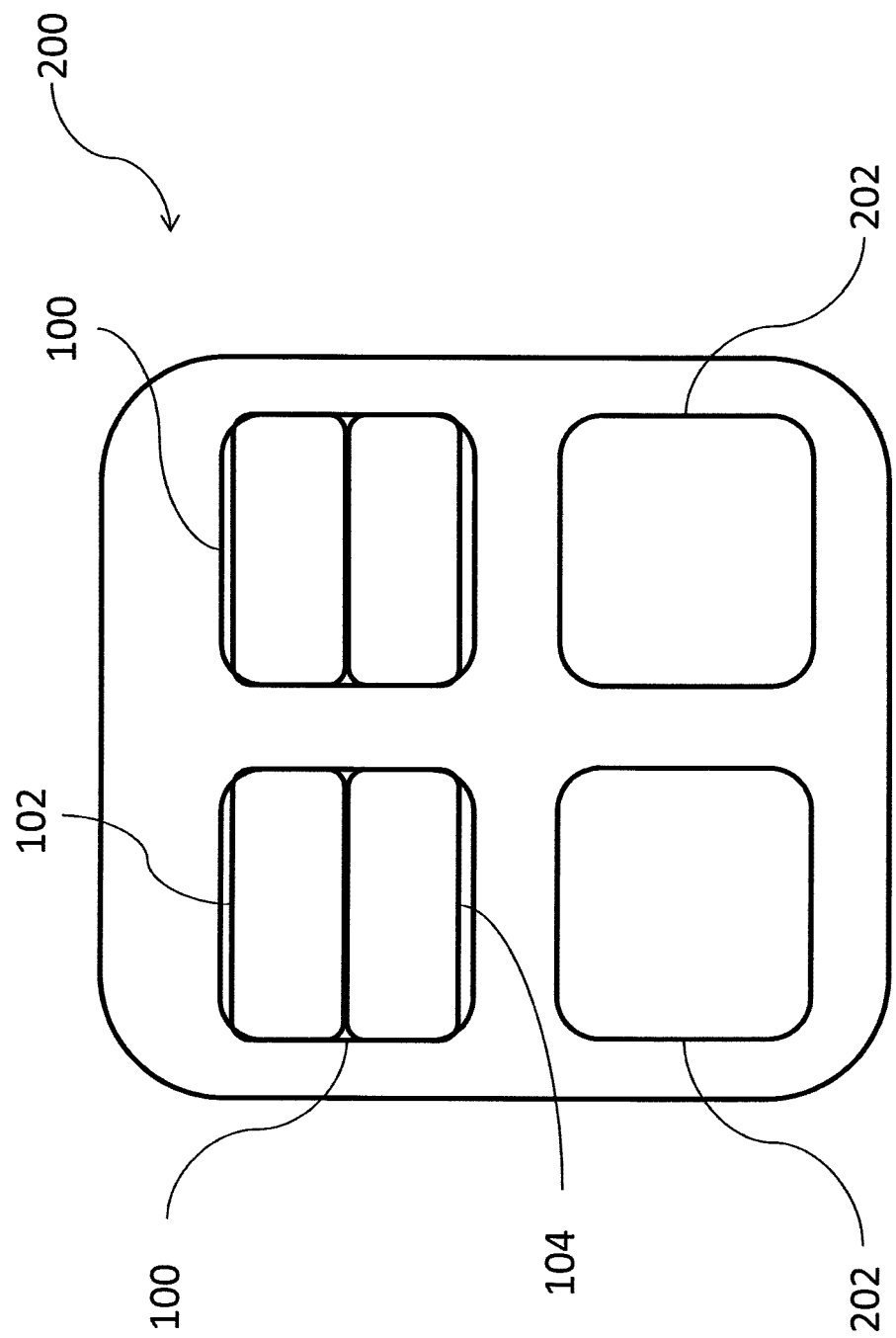
FIG. 2 is a schematic drawing of a data storage system including a hybrid SSD according to an embodiment of the present disclosure.

FIG. 2 illustrates a data storage system 200 according to an embodiment of the present disclosure comprising one or more hybrid SSDs 100. Data storage system 200 may further include any other suitable storage devices 202, such as but not limited to, one or more HDDs, one or more tape drives, one or more optical drives, one or more RAM-based memory devices or other SSDs, etc. It will be recognized by those skilled in the art that a data storage system 200 could include various combinations of hybrid SSDs 100, as described herein, and other storage devices 202.

Regardless of what components comprise a data storage system, as described herein, an overall goal for the system may include storing data in a manner that balances efficiency, reliability, and/or cost. One method that can be used to meet these objectives is data progression (DP). DP can be used to efficiently allocate data to the device of appropriate cost, as determined by the price, performance, capacity, and/or function of the drive, etc. For example, DP may move non-recently accessed data and historical snapshot data to less expensive storage. It will be recognized, however, that DP can be used to move data of any type from one device to another or from one storage space to another in order to increase the efficiency of the system. DP generally includes the ability to automatically classify drives or devices relative to the other drives or devices within a data storage system. For example, the system may examine a drive or device to determine its performance relative to the other drives or devices in the system. The faster and/or more efficient drives or devices may be classified in a higher value classification, and the slower and/or less efficient drives or devices may be classified in a lower value classification. As drives or devices are added to a system, the system can automatically rebalance the value of classifications of the drives or devices. For a detailed description of DP and further aspects of a data storage system suitable for a data storage system as disclosed herein comprising one or more hybrid SSDs, see U.S. Pat. No. 7,398,418, issued Jul. 8, 2008, (Ser. No. 11/689,862), entitled "Virtual Disk Drive System and Method," as well as published U.S. patent application Ser. No. 11/753,357, entitled "Data Progression Disk Locality Optimization System and Method," and U.S. Prov. patent application Ser. No. 12/537,408, filed Aug. 7, 2009, entitled, "System and Method for Transferring Data Between Different RAID Data Storage Types for Current Data and Replay Data," each of which are herein incorporated by reference in their entirety.

As described in U.S. patent application Ser. No. 12/501,907, in a system that includes both SSDs and HDDs, DP may be used to classify each device's performance, reliability, cost, etc. relative to the others and utilize DP to realize data storage efficiencies. All of the data storage efficiencies described in the above-referenced patent and applications can be utilized and realized in a data storage system including SSDs, such as efficiencies gained from RAID and DP. For example, DP may be used to efficiently allocate data between SSDs of different efficiency levels, such as SLC and MLC devices in a data storage system. DP may be used to move data gradually to storage space of appropriate cost, allowing a user to add additional SSD drives only when they are actually needed. This may significantly reduce the overall cost of the data storage system. Similarly, in some embodiments, a data storage system may include snapshot functions to allow efficient storage of Point-In-Time Copies (PITCs) of a virtual volume matrix, instant data fusion, and data instant replay for data backup, recovery, testing, etc., remote data storage, and data progression, etc., each of which is described in detail in U.S. Pat. No. 7,398,418, which was previously incorporated by reference in its entirety.

In further embodiments of the present disclosure, DP may be similarly applied to a data storage system having one or more hybrid SSDs, as described herein. In one embodiment of the present disclosure, for example, for any given hybrid SSD 100, the data storage system 200 may be configured to utilize the SLC memory portion 102 and MLC memory portion 104 of the SSD in a manner that balances the efficiency, reliability, and/or cost of those types of memory. For example, because SLC memory is characterized by having both great read durability and great write durability, it may be less efficient to utilize the more costly SLC memory portion 102 of a hybrid SSD for storing read-only or read-mostly data or data that is accessed rather infrequently for write I/O operations. Accordingly, in one embodiment, the SLC memory portion 102 can be utilized for storing data that is accessed and rewritten relatively frequently, thereby accepting both write I/O operations and read I/O operations. In contrast, MLC memory has relatively poor write durability but great read durability. It may be less efficient to therefore use the MLC memory portion 104 to store data that frequently needs to be rewritten. However, it could be efficient to use the lower cost MLC memory portion 104 for storing read-only or read-mostly data or data that is accessed relatively infrequently for write I/O operations. In this way, in one embodiment, the advantages of both SLC memory and MLC memory can be realized in a single hybrid SSD, while also balancing the relatively higher cost of SLC memory against the lower cost of MLC memory.

In one particular embodiment, for example, the data storage system 200 may be configured to store initial or new writes to the SLC memory portion 102 of a hybrid SSD 100. The writes and rewrites to the SLC memory portion 102 may be tracked or monitored. If a portion, data block, data page, etc. has not been recently written or rewritten, based on some determining threshold, which may be pre-determined or determined dynamically based on any suitable factors known to the data storage system, the data stored in that portion, data block, data page, etc. may be moved to the MLC memory portion 104. More particularly, in one embodiment, DP may be used to move non-recently accessed data and/or historical snapshot data to less expensive storage of the hybrid SSD; for example, from the SLC memory portion 102 to the MLC memory portion 104. For non-recently accessed data, therefore, DP may gradually reduce the cost of storage for any page that has not been recently accessed. As was mentioned above, however, DP can be used to move any type of data from the SLC memory portion 102 to the MLC memory portion 104, or vice versa in order to store the data in the data storage system more efficiently. One advantage of a hybrid SSD utilizing DP includes maintaining high I/O access to data currently being accessed and reducing the need to purchase fast but expensive SLC SSDs.

Figure 3:
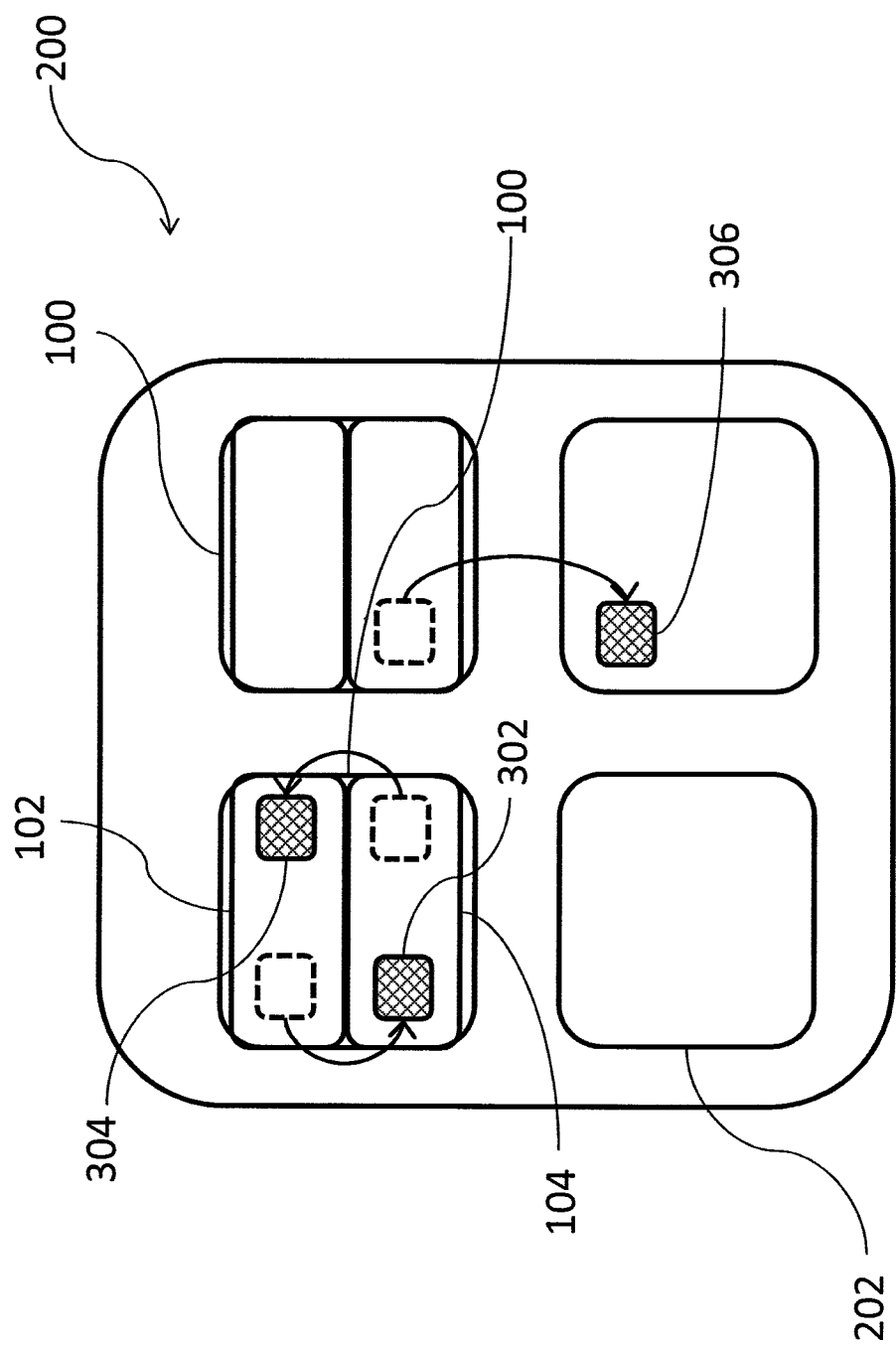
FIG. 3 is a schematic drawing of data progression in a data storage system including a hybrid SSD according to an embodiment of the present disclosure.

FIG. 3 illustrates an embodiment of the present disclosure where DP may be used to move infrequently accessed data 302 from a SLC memory portion 102 of a hybrid SSD 100 to a MLC memory portion 104 of the SSD. Similarly, frequently accessed data 304, or read data that needs to be written to, may be moved from the MLC memory portion 104 to the SLC memory portion by means of DP. In another embodiment, infrequently or very infrequently accessed data may be moved to yet another storage tier device 306, such as an HDD or tape backup. Any suitably number of classified storage tiers may be utilized in this manner. Data storage efficiencies are achieved in this embodiment because infrequently accessed data does not take up valuable high-cost storage. Rather, less costly storage is used for infrequently accessed data. In instances where SLC and MLC memory are utilized, storage efficiency is also gained by moving frequently used data to a faster and more reliable storage area, as reliability and write speed are increased for data stored on the SLC memory as opposed to the MLC memory.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled. For example, while discussed with respect to SLC and MLC memory, it is recognized that a single SSD according to the present disclosure may comprise a hybrid of any suitable memory cell technology, and is not limited to SLC and MLC memory cell technology. For instance, a hybrid SSD according to the present disclosure could have a portion of triple-level cell (TLC) memory or other cell technology developed in the future in place of either the SLC or MLC memory portions or in addition to the SLC and MLC memory portions.

I claim:

1. A data storage system comprising:
    a hybrid solid state drive (SSD) having both a first memory portion comprising single-level cell (SLC) flash memory and a second memory portion comprising multi-level cell (MLC) flash memory;
        wherein the first memory portion is either read/write optimized or read optimized and the second memory portion is the other of either read/write optimized or read optimized from the first memory portion;
        wherein at least one of the memory portions is reconfigurable on demand between a read/write optimized memory portion and a read optimized memory portion; and
        wherein data progression is used to move read/write data to the read/write optimized memory portion and read-only data to the read optimized memory portion.

2. The data storage system of claim 1, wherein the first memory portion comprises less than 50% of the overall memory of the solid state drive.

3. The data storage system of claim 2, wherein the first memory portion comprises between about 20% and 30% of the overall memory of the solid state drive.

4. The data storage system of claim 1, wherein the first memory portion stores read/write data.

5. The data storage system of claim 1, wherein the second memory portion stores read-mostly data.

6. The data storage system of claim 4, wherein the second memory portion stores read-mostly data.

7. The data storage system of claim 6, wherein the second memory portion stores historical data.

8. A data storage system comprising at least one hybrid solid state drive (SSD) comprising single-level cell (SLC) flash memory that is read/write optimized and multi-level cell (MLC) flash memory that is read optimized, wherein read-only data is moved to the read optimized MLC flash memory, and wherein at least one of the SLC flash memory and MLC flash memory is reconfigurable on demand between read/write optimized and read optimized.

9. The data storage system of claim 8, further comprising hard disk drives.

10. The data storage system of claim 8, further configured to monitor write operations to the SLC memory of the hybrid SSD, determine whether the frequency of write operations to a particular portion of the SLC memory is below a determined threshold, and move the data stored in the particular portion of the SLC memory to the MLC memory of the hybrid SSD.

11. The data storage system of claim 10, further comprising another type of storage device, and configured to move data stored in the MLC memory of the hybrid SSD to the other type of storage device.

12. The data storage system of claim 11, wherein the other type of storage device is a hard disk drive.

13. The data storage system of claim 8, further configured to store historical data in the MLC memory of the hybrid SSD.

14. A method of data progression in a hybrid solid state drive having both single-level cell (SLC) flash memory that is read/write optimized and multi-level cell (MLC) flash memory that is read optimized, the method comprising:
    monitoring write operations to the SLC memory;
    determining whether the frequency of write operations to a particular portion of the SLC memory is below a determined threshold; and
    if it is determined that the frequency of write operations to the particular portion of the SLC memory is below the determined threshold, moving the data stored in the particular portion of the SLC memory to the MLC memory; and
    reconfiguring at least one of the SLC memory and MLC memory on demand between read/write optimized and read optimized.

15. The data storage system of claim 1, wherein data progression is used to automatically move data between the read/write optimized memory portion and the read optimized memory portion.

16. The data storage system of claim 1, wherein read/write data is separately bundled for execution and read-only data is separately bundled for execution.

* * * * *

UNITED STATES PATENT AND TRADEMARK OFFICE
CERTIFICATE OF CORRECTION

| | | |
|---|---|---|
| PATENT NO. | : 9,146,851 B2 | Page 1 of 1 |
| APPLICATION NO. | : 13/429511 | |
| DATED | : September 29, 2015 | |
| INVENTOR(S) | : Pittelko et al. | |

It is certified that error appears in the above-identified patent and that said Letters Patent is hereby corrected as shown below:

Title Page, Item (12) "Pittelko" should read -- Pittelko, et al. --.

Title Page, Item (75) Inventor is corrected to read:
-- Michael H. Pittelko, Chaska (MN);
   Michael J. Klemm, Minnentonka (MN) --.

Signed and Sealed this
Seventh Day of June, 2016

Michelle K. Lee
*Director of the United States Patent and Trademark Office*